United States Patent
Koizumi

(10) Patent No.: US 6,451,274 B1
(45) Date of Patent: Sep. 17, 2002

(54) DEPLETED $UF_6$ PROCESSING PLANT AND METHOD FOR PROCESSING DEPLETED $UF_6$

(75) Inventor: Hiromichi Koizumi, Mito (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/494,346

(22) Filed: Jan. 31, 2000

(30) Foreign Application Priority Data

Jun. 16, 1999 (JP) .......................................... 11-169443

(51) Int. Cl.[7] .................. C01G 56/00; C01G 43/01; C01G 43/025; C01B 7/19; C01F 11/00
(52) U.S. Cl. ......................... 423/3; 423/260; 423/261; 423/483; 423/484; 423/490; 422/139; 422/142
(58) Field of Search .......................... 423/3, 260, 483, 423/484, 490, 261; 422/139, 142

(56) References Cited

U.S. PATENT DOCUMENTS

| | | | | |
|---|---|---|---|---|
| 3,235,327 A | * | 2/1966 | Blundell et al. | 423/261 |
| 3,547,598 A | * | 12/1970 | Knudsen | 423/261 |
| 3,743,704 A | * | 7/1973 | West | 423/490 |
| 3,765,844 A | * | 10/1973 | Rode | 423/258 |
| 3,906,081 A | * | 9/1975 | Welty | 423/260 |
| 4,020,146 A | * | 4/1977 | Knudsen | 423/258 |
| 4,053,559 A | * | 10/1977 | Hart et al. | 423/258 |
| 4,963,294 A | * | 10/1990 | Yato et al. | 423/254 |

FOREIGN PATENT DOCUMENTS

| | | | | |
|---|---|---|---|---|
| GB | 2106487 | * | 4/1983 | 423/260 |
| SU | 420565 | * | 8/1974 | 423/490 |

* cited by examiner

*Primary Examiner*—Steven Bos
(74) *Attorney, Agent, or Firm*—Oblon, Spivak, McClelland, Maier & Neustadt, P.C.

(57) ABSTRACT

The object of the present invention is to simplify the depleted $UF_6$ processing plant and processing method and to prevent calcium fluoride to be a fine powder, wherein the processing plant comprises a first fluidized bed reactor for forming $UO_2F_2$ and hydrogen fluoride by allowing depleted $UF_6$ to react with steam, a second fluidized bed reactor for forming $U_3O_a$, hydrogen fluoride and oxygen by allowing $UO_2F_2$ to react with steam, a gas cooler for cooling hydrogen fluoride at 150 to 300° C., and a fluoride fixing reactor for forming calcium fluoride by allowing cooled hydrogen fluoride to contact calcium carbonate; and wherein the processing process comprises a dry vapor-phase reaction step for forcing $UO_2F_2$ and hydrogen fluoride by allowing depleted $UF_6$ to react with steam at a temperature of 230 to 280° C., and a fluorine fixing step for forming granular calcium fluoride by allowing hydrogen fluoride generated in the dry vapor-phase reaction step to contact granular calcium carbide at a temperature of 150 to 300° C.

10 Claims, 1 Drawing Sheet

DEPLETED UF$_6$ PROCESSING PLANT AND METHOD FOR PROCESSING DEPLETED UF$_6$

BACKGROUND OF THE INVENTION

1. Field of the Invention

The present invention relates to a depleted UF$_6$ processing plant for processing depleted UF$_6$ by converting UF$_6$ into U$_3$O$_8$, and a method for processing depleted UF$_6$.

2. Description of the Related Art

The proportion of depleted UF$_6$ accumulated in an uranium enrichment plant amount to nearly 90% of the UF$_6$ starting material, and it is mostly stored by filling in a UF$_6$ cylinder that is a cylindrical sealed storage vessel. However, since this substance is almost permanently stored, there arises a management problem of maintaining the vessel with a large quantity of depleted UF$_6$ from corrosion over an extended period of time, as well as waste of resources and economical deficiencies caused by a vast amount of fluorine resources being stored in the form of UF$_6$.

A large amount of depleted UF$_6$ containing a low concentration of U$_{235}$ is accumulated in the enrichment process of U$_{235}$ in the uranium enrichment plant when U$_{235}$ is enriched using UF$_6$ produced from natural uranium or recovered UF$_6$ as a starting material. To solve the problems described, the inventors of the present invention proposed a method for processing depleted UF$_6$ by converting depleted UF$_6$ containing a low concentration of U$_{235}$ into U$_3$O$_8$ by a dry vapor-phase reaction method (Japanese Unexamined Patent Publication No. 11-79749). The method for processing depleted UF$_6$ comprises: extracting anhydrous hydrogen fluoride as a by-product using concentrated sulfuric acid and separating hydrogen fluoride from dilute sulfuric acid by distillation; further distilling and concentrating dilute sulfuric acid to separate dilute hydrofluoric acid and concentrated sulfuric acid; recycling this concentrated sulfuric acid to the extraction and concentration step while further distilling dilute hydrofluoric acid to separate it into azeotropic hydrofluoric acid and water that contains a small amount of hydrofluoric acid; and mixing azeotropic hydrofluoric acid with dilute hydrofluoric acid in the distillation and concentration step to improve recovery of hydrogen fluoride for recycling it in the nuclear facilities.

However, two distillation columns and one concentration column are required to regenerate hydrogen fluoride by the processing process of depleted UF$_6$ described above in the nuclear facilities. In recycling hydrogen fluoride in the existing nuclear facilities, equipments related to the recycling should be additionally installed, resulting that supply of anhydrous hydrogen fluoride does not match demands for it. Accordingly, hydrogen fluoride generated as a by-product when depleted UF$_6$ is converted into U$_3$O$_8$ is also desired to be recovered and stored since it can be readily recycled.

The method for recovering and storing fluorine known in the art includes forming calcium fluoride by a fixing reaction of fluorine to calcium, followed by storage of calcium fluoride. The inventors of the present invention proposed a method for recovering granular calcium fluoride by allowing a solution mainly containing hydrogen fluoride to contact granular calcium carbonate, and an equipment to be used for the method (Japanese Unexamined Patent Publication No. 10-330113). This equipment comprises a storage tank for storing a solution containing 10 to 60% of hydrogen fluoride, a first cooler for cooling the solution stored in the storage tank to 0 to 5° C., a reaction tank for forming a solution containing granular calcium fluoride by adding granular calcium carbonate to the solution at a temperature of 0 to 5° C. fed from the storage tank, and a solid/liquid separator for separating granular calcium fluoride from the solution containing it. This method is so devised that fluorine is recovered with a high yield by forming calcium fluoride by cooling the reaction solution to 0 to 5° C. in the first cooler.

However, the hydrogen fluoride gas generated as a by-product when UF$_6$ is converted into U$_3$O$_8$ is once turned into an aqueous hydrogen fluoride solution containing 10 to 60% of hydrogen fluoride, in order to recover hydrogen fluoride as a by-product using the equipment disclosed in Japanese Unexamined Patent Publication No. 10-330113. The foregoing conversion process requires additional facilities to be installed. It is also a problem in the conventional process described above that the recovery work becomes much complicated if hydrogen fluoride generated as a by-product in converting UF$_6$ into U$_3$O$_8$ could not be recovered. Also, there is a drawback that calcium fluoride formed by the recovery of hydrogen fluoride tend to be a fine powder.

SUMMARY OF THE INVENTION

Accordingly, one object of the present invention is to provide a depleted UF$_6$ processing plant which simplifies its facilities and processes while preventing recovered calcium fluoride from being a fine powder, and a method for processing depleted UF$_6$.

One aspect of the present invention provides a depleted UF$_6$ processing plant including a first fluidized bed reactor constructed so that UO$_2$F$_2$ and hydrogen fluoride is formed by allowing depleted UF$_6$ to react with steam, and a second fluidized bed reactor constructed so that U$_3$O$_8$, hydrogen fluoride and oxygen is formed by allowing UO$_2$F$_2$ to further react with steam.

The processing plant further includes a gas cooler for cooling hydrogen fluoride generated in the first and second fluidized bed reactors to 150 to 300° C., and a fluorine fixing reactor, which is filled with granular calcium carbonate 13a so that hydrogen fluoride cooled to 150 to 300° C. by the gas cooler passes through, and forms granular calcium fluoride when hydrogen fluoride passing through the fluorine fixing reactor makes contact with granular calcium carbonate.

In the plant as described above, gaseous hydrogen fluoride generated in the first and second fluidized bed reactors is directly introduced into the fluorine fixing reactor. UF$_6$ is converted into U$_3$O$_8$ simultaneously while forming granular calcium fluoride by allowing hydrogen fluoride to contact calcium carbonate in the fluorine fixing reactor, thereby recovering hydrogen fluoride as a by-product.

Calcium carbonate filled in the fluorine fixing reactor preferably has a grain size of 350 to 800 μm. When the grain size is less than 350 μm, hydrogen fluoride flow is inhibited while, when the grain size exceeds 800 μm, the total surface area of calcium carbonate diminishes, thereby reducing the amount of calcium fluoride formed.

It is preferable that a plurality of cylinders in which calcium carbonate is housed are arranged, for example, on a circle so as to be exchangeable one another in the fluorine fixing reactor. After converting calcium carbonate into calcium fluoride by allowing hydrogen fluoride to pass through one or two of the plural cylinders, the cylinders in which calcium carbonate has been converted into calcium fluoride are replaced with another fresh cylinder to enable additional hydrogen fluoride to pass through the cylinders. A continuous processing of depleted UF$_6$ is thus made possible when a fluorine fixing reactor capable of readily exchanging calcium carbonate is used.

The method for processing depleted $UF_6$ preferably includes: a dry vapor-phase reaction step for forming $UO_2F_2$ by allowing depleted $UF_6$ to react with steam at 230 to 280° C., followed by forming $U_3O_8$, hydrogen fluoride and oxygen by allowing $UO_2F_2$ to further react with steam at 600 to 700° C.; and a fluorine fixing step for forming granular calcium fluorides by allowing hydrogen fluoride generated in the dry vapor-phase reaction step to contact granular calcium carbonate at 150 to 300° C.

In the method described above, $UO_2F_2$ grains with a mean grain size of 100 to 250 $\mu$m and a bulk density of 3.5 g/cm$^2$ or more, and hydrogen fluoride are formed by allowing depleted $UF_6$ to react with steam by adjusting the reaction temperature at 230 to 280° C.; and $U_3O_8$, hydrogen fluoride and oxygen are formed by further allowing the $UO_2F_2$ grains having the properties as described above to react with steam by adjusting the reaction temperature at 600° C. or more. $U_3O_8$ thus formed has an approximately uniform mean grain size and an increased bulk density by about 10%, besides having good fluidity and being easy in handling to improve storage efficiency.

The granular shape of the calcium fluoride grains can be prevented from being collapsed by allowing gaseous hydrogen fluoride to directly contact the granular calcium carbonate and maintaining the temperature above the boiling point, or at 150 to 300° C., of hydrogen fluoride formed in the dry vapor-phase reaction step, thus making handling of calcium fluoride formed by the fluoride fixing reaction easy.

In accordance with another aspect of the present invention, the dilute hydrofluoric acid formed in the fluorine fixing step described above is used for the steam to be used in the dry vapor-phase reaction process.

In the method as described above, efflux of the secondary waste water is reduced by using the dilute hydrofluoric acid solution discharged in the fluorine fixing reaction step as the steam for the dry vapor-phase reaction step.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
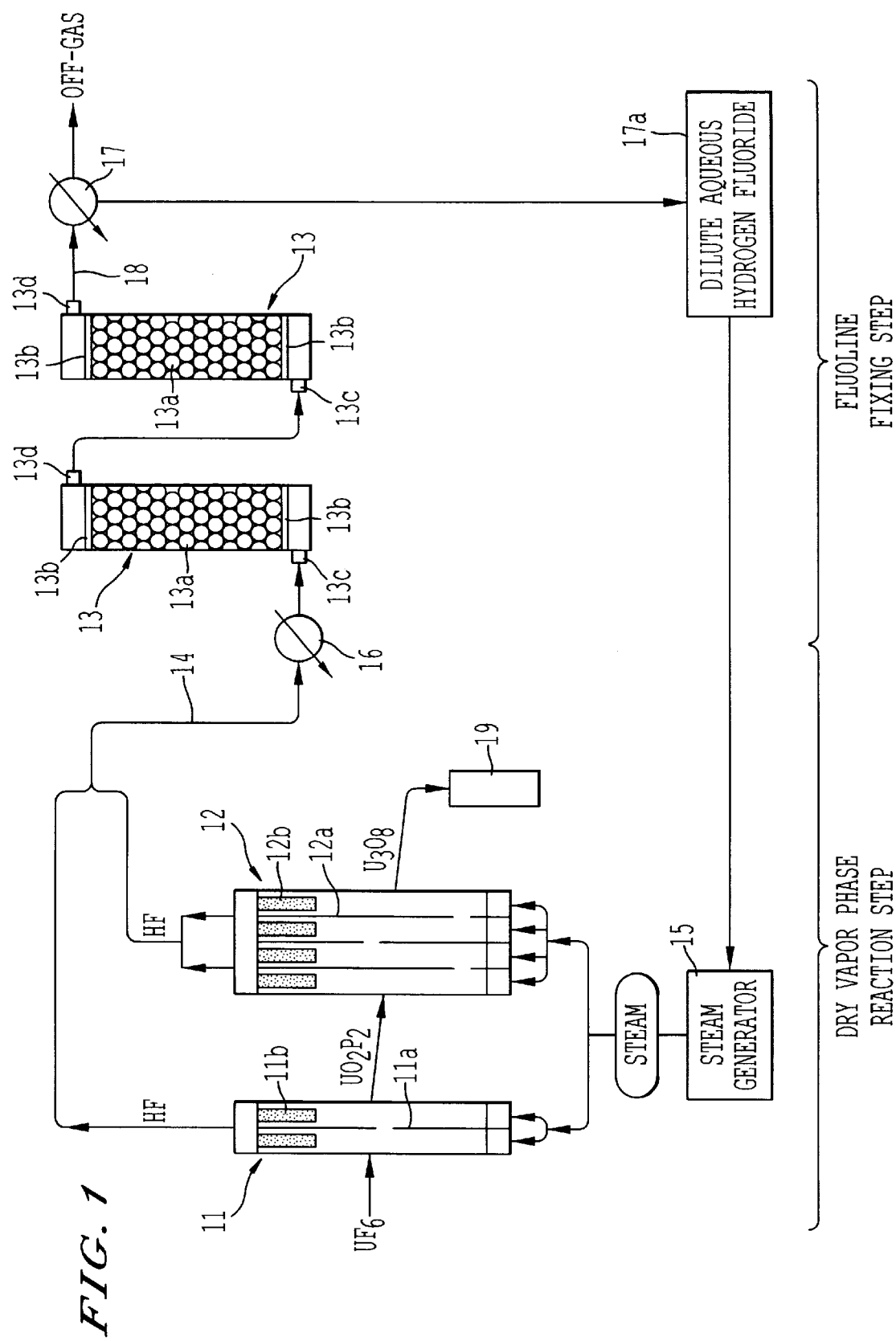
FIG. 1 is a system diagram showing a flow of a processing method and a processing plant according to an embodiment of the present invention.

The present invention will now be described in detail with reference to the drawing of the embodiment according to the present invention as shown in FIG. 1.

In FIG. 1, the depleted $UF_6$ processing plant according to one embodiment of the present invention comprises: a first fluidized bed reactor 11 for forming $UO_2F_2$ and hydrogen fluoride by allowing depleted $UF_6$ to react with steam; a second fluidized bed reactor 12 for forming $U_3O_8$, hydrogen fluoride and oxygen by allowing $UO_2F_2$ to further react with steam; and a fluorine fixing reactor 13 for allowing hydrogen fluoride formed in the first and second fluidized bed reactors 11 and 12 to have contact with calcium carbonate 13a. The first and second fluidized bed reactors 11 and 12 are plate type fluidized bed reactors each having a plurality of chambers, and increase in the installation area for the plant is suppressed by using the plate type fluidized bed reactors. The plate type fluidized bed reactors in this embodiment comprises plural chambers divided by one or plural partition plates 11a and 12a vertically disposed in the fluidized bed. Gas/solid separation filters 11b, 12b are provided at the upper parts of the plural chambers divided by the partition plates 11a and 12a. Heaters (not shown) are provided in the first and second fluidized bed reactors 11 and 12, each heater being so constructed as to enable the reaction temperature in respective fluidized bed reactors 11 and 12 to be controlled. Steam introduced into the first and second fluidized bed reactors 11 and 12 from their bottoms is generated in a steam generator 15.

The fluorine fixing reactor 13 comprises plural slender cylinders filled with granular calcium carbonate 13a. A gas inlet port 13c is provided at the bottom of each cylinder, and a discharge part 13d is provided at the top of the cylinder for discharging the gas passing through the filled calcium carbonate 13a. A pair of partition plates 13b and 13b, on which a number of holes for the discharge gas to pass through but not granular calcium carbonate 13a are provided, are provided at the top and bottom in the cylinder, and the calcium carbonate 13a is filled between this pair of the partition plates 13b and 13b. A plurality of cylinders (not shown) are disposed in a circle and exchangeable one another, and hydrogen fluoride is made to contact the calcium carbonate 13a filled in two cylinders among the plural cylinders. Actually, an inlet 13c of the first cylinder is connected to the first and second fluidized bed reactors 11 and 12 via a first piping 14, and a gas cooler 16 is provided at the first piping. A discharge port 13d of the first cylinder is connected to an inlet port 13c of the second cylinder, and a discharge port 13d of the second cylinder is connected to a condenser 17 via a second piping 18. The fluorine fixing reactor 13 is so constructed as to form granular calcium fluoride by allowing gaseous hydrogen fluoride generated in the first and second fluidized bed reactors 11 and 12 to sequentially contact the granular calcium carbonate 13a filled in the first and second cylinders. The cylinders are arranged so that additional hydrogen fluoride is fed by replacing saturated cylinders with fresh cylinders.

The method for processing depleted $UF_6$ according to one embodiment of the present invention using the plant having the construction as described above will be described below.

Dry vapor-phase reaction step

A reaction temperature in the first fluidized bed reactor 11 for allowing depleted $UF_6$ to react with steam is controlled to 230 to 280° C. with a heater (not shown), while a reaction temperature in the second fluidized bed reactor 12 for allowing $UO_2F_2$ to further react with steam is controlled to 600 to 700° C. $UO_2F_2$ granules with a mean grain size of 100 to 250 $\mu$m and a bulk density of 3.5 g/cm$^3$, and hydrogen fluoride are formed by allowing depleted $UF_6$ to react with steam in the first fluidized bed reactor 11 controlled to 230 to 280° C. When the reaction temperature in the first fluidized bed reactor 11 is less than 230° C., physical properties of the granules may be deteriorated, while the reaction temperature exceeding 280° C. is not desirable since the bulk density is decreased. Accordingly, the preferable reaction temperature in the first fluidized bed reactor 11 is 230 to 260° C.

$U_3O_8$, hydrogen fluoride and oxygen are formed by allowing the $UO_2F_2$ granules having the properties as described above to further react with steam in the second fluidized bed reactor 12 controlled to 600 to 700° C. The recovered $U_3O_8$ powder is accommodated in a storage vessel 19 for storage of an extended period of time. $U_3O_8$ granules having a mean grain size of 100 to 250 $\mu$m have good fluidity and easy handling, and a bulk density of 3.5 g/cm$^3$, which improves storage efficiency. Such $U_3O_8$ granules can be obtained by processing $UF_6$ as described above. A reaction temperature of the second fluidized bed reactor 11 of less than 600° C. is not desirable since the reaction ratio may decrease while the equipments may be corroded at a temperature over 700° C. Accordingly, a particularly preferable temperature is from 600 through 650° C.

Fluorine Fixing Process

Hydrogen fluoride as by-products of the first fluidized bed reactor 11 and second fluidized bed reactor 12 is introduced into the fluorine fixing reactor 13 via the first piping 14. A temperature of hydrogen fluoride passing through the first piping is controlled to 150 to 300° C. with the gas cooler 16. The hydrogen fluoride controlled to 150 to 300° C. flows from the gas inlet 13c of the first and second cylinders into the bottom partition plate 13b and advances through calcium carbonate granules. Calcium fluoride is formed by allowing the hydrogen fluoride to react with the calcium carbonate granules 13a, thereby trapping the hydrogen fluoride. A part of the hydrogen fluoride may be condensed when the reaction temperature is less than 150° C., while a temperature of over 300° C. is not desirable since a grain size of resultant calcium fluoride becomes too fine. Accordingly, a preferable reaction temperature for hydrogen fluoride is from 200 through 250° C. The gas after trapping hydrogen fluoride is discharged from the discharge port 13d by passing through the upper partition plates 13b in the second cylinder.

The gas discharged from the discharge port 13d is transferred to the condenser 17 through the second piping 18. A dilute aqueous hydrogen fluoride solution liquefied and recovered in the condenser 17 is temporarily received in a storage vessel 17a for utilizing it thereafter. Since the content of fluorine fractions in the aqueous hydrogen fluoride solution received in the storage vessel 17a is so small that corrosion of the steam generator 15 is negligible except small influence on the reaction characteristics in the first and second fluidized bed reactors 11 and 12. Therefore, the aqueous hydrogen fluoride solution can be used for generating steam for the dry vapor-phase reaction process after being transferred to the steam generator 15.

EXAMPLES

Example 1

Hydrogen fluoride was processed in the fluorine fixing reactor 13. 10 kg each of calcium carbonate granules 13a with a grain size of 350 $\mu$m were filled into the first and second cylinders. After adjusting the temperature of the hydrogen fluoride at 200° C. with the gas cooler, fluorine was fixed by feeding the gas at a feed rate of 2000 litters/hour. A hydrogen fluoride gas discharged from the second cylinder was recovered in the condenser 17 at a recovery rate of 2.5 litters/hour as a dilute aqueous hydrogen fluoride solution, and the concentration of fluorine in the solution was measured to be 800 ppm. Feed of the hydrogen fluoride was stopped after 30 minutes, and calcium fluoride formed by conversion of calcium carbonate was recovered.

Comparative Example 1

Hydrogen fluoride was processed by the equipment disclosed in Japanese Unexamined Patent Publication No. 10-330113 described in the related art. 1.3 kg of calcium carbonate granules were added to 1 litter of an aqueous solution containing 50% of hydrogen fluoride while adjusting the temperature at 30° C. After a solution containing calcium fluoride granules had been formed, calcium fluoride was recovered by solid/liquid separation.

Evaluation

The purity of the recovered calcium fluoride, the conversion ratios and purity of the hydrogen fluoride, the concentrations of the aqueous hydrogen fluoride solution condensed in the condenser, and the purity of the calcium fluoride granules were determined with respect to Example 1 and Comparative Example 1. The results are shown in TABLE 1.

TABLE 1

| | EXAMPLE 1 | COMPARATIVE EXAMPLE 1 |
|---|---|---|
| PURITY OF CALCIUM FLUORIDE | 97% OR MORE | 97% OR MORE |
| CONVERSION RATIO OF FLUORINE | 99% OR MORE | 90% OR MORE |
| CONCENTRATION OF AQUEOUS HYDROGEN FLUORIDE AFTER THE REACTION | 800 PPM | 5% BY WEIGHT |
| PROPORTION OF CALCIUM FLUORIDE GRANULES HAVING A PARTICLE SIZE OF 100 $\mu$m OR LESS | LESS THAN 5% | LESS THAN 15% |

Table 1 clearly shows that, although relatively high purity calcium fluoride is obtained in both Example 1 and Comparative Example 1, fluorine is converted into calcium fluoride with a higher conversion ratio in Example 1 than in Comparative Example 1, because hydrogen fluoride is directly introduced into the fluorine fixing reactor in a gaseous state.

Since the concentration of the aqueous hydrogen fluoride solution in Example 1 after the reaction is 800 ppm, corrosion of the steam generator is negligible even when the dilute aqueous hydrogen fluoride solution is used as a steam source in the dry vapor-phase reaction process, leaving no influence on the reaction characteristics of the first and second fluidized bed reactors 11 and 12.

Moreover, while the proportion of the calcium fluoride particles having a grain size of 100 $\mu$m or less formed after forming the fine powders was less than 15% in Comparative example 1, the corresponding proportion in Example 1 was less than 5%. Therefore, formation of a fine powder is more suppressed in Example 1 than in Comparative Example 1.

One aspect of the present invention is to provide a fluorine fixing reactor for forming granular calcium fluoride by allowing hydrogen fluoride cooled with a gas cooler to make contact with granular calcium carbonate, thereby enabling granular calcium fluoride to be formed by allowing gaseous hydrogen fluoride to contact calcium carbonate after directly introducing gaseous hydrogen fluoride into the fluorine fixing reactor. Therefore, needs for the equipments required in the conventional process such as a distillation column and concentration column, or a converter for converting gaseous hydrogen fluoride into an aqueous solution of hydrogen fluoride and a storage tank for storing the solution, are eliminated, making it possible to simplify a depleted $UF_6$ processing plant.

Another aspect of the present invention is to provide a gas cooler for cooling hydrogen fluoride generated in the first and second fluidized bed reactors at a temperature of 150 to 300° C., thus enabling the hydrogen fluoride generated in the first and second fluidized bed reactors to be directly introduced into the fluorine fixing reactor. Accordingly, a depleted $UF_6$ processing process is simplified besides preventing calcium fluoride particles from collapsing by allowing the hydrogen fluoride to contact the calcium carbonate at a temperature of 150 to 300° C. Consequently, the granular shapes of the calcium fluoride are maintained, making handling of the calcium fluoride for fixing fluorine easy in the following processing steps.

Efflux of the secondary waste water is reduced by using the dilute aqueous hydrogen fluoride solution generated in the fluorine fixing step for steam in the dry vapor-phase reaction step, thereby reducing the processing plant size and enabling depleted $UF_6$ to be cheaply processed.

Obviously, numerous modifications and variations of the present invention are possible in light of the above teachings. It is therefore to be understood that within the scope of the appended claims, the invention may be practiced otherwise than as specifically described herein.

What is claimed is:

1. A depleted $UF_6$ processing plant comprising:
    a first fluidized bed reactor having at least one plate and configured to react depleted $UF_6$ with steam at a temperature of 230 to 280° C. and produce $UO_2F_2$ and hydrogen fluoride, the at least one plate forming a plurality of communicated chambers in the first fluidized bed reactor;
    a second fluidized bed reactor having at least one plate, connected to the first fluidized bed reactor and configured to react the $UO_2F_2$ with steam at a temperature of 600 to 700° C. and produce $U_3O_8$, hydrogen fluoride and oxygen, the at least one plate forming a plurality of communicated chambers in the second fluidized bed reactor; and
    a fluorine fixing reactor including granular calcium carbonate and connected to the first and second fluidized bed reactors, the fluorine fixing reactor being configured to react the hydrogen fluoride generated in the first and second fluidized bed reactors with the granular calcium carbonate at a temperature of 150 to 300° C. and produce granular calcium fluoride.

2. A depleted $UF_6$ processing plant according to claim 1, further comprising a condenser connected to the fluorine fixing reactor and configured to condense a gas discharged from the fluorine fixing reactor, wherein the condenser is communicated to the first and second fluidized bed reactors to recycle a dilute aqueous hydrogen fluoride solution produced in the condenser to a steam generator to form steam for use in the first and second fluidized bed reactors.

3. A depleted $UF_6$ processing plant according to claim 1, wherein the fluorine fixing reactor comprises a plurality of cylinders configured to exchangeably connect one after another to the first and second fluidized bed reactors.

4. A depleted $UF_6$ processing plant according to claim 1, further comprising a cooling device connected to the first and second fluidized bed reactors and configured to cool down the hydrogen fluoride produced in the first and second fluidized bed reactors to 150 to 300° C.

5. A depleted $UF_6$ processing plant according to claim 1, wherein the first and second fluidized bed reactors each have the plurality of communicated chambers vertically partitioned by the at least one partition plate.

6. A method for processing depleted $UF_6$, comprising the steps of:
    reacting the depleted $UF_6$ and steam at a temperature of 230 to 280° C. in a first fluidized bed reactor having at least one plate and configured to react depleted $UF_6$ with steam to produce $UO_2F_2$ and hydrogen fluoride, the at least one plate forming a plurality of communicated chambers in the first fluidized bed reactor;
    reacting the $UO_2F_2$ with steam at a temperature of 600 to 700° C. in a second fluidized bed reactor having at least one plate and configured to react $UO_2F_2$ with steam to produce $U_3O_8$, hydrogen fluoride and oxygen, the at least one plate forming a plurality of communicated chambers in the second fluidized bed reactor; and
    reacting the hydrogen fluoride generated in the first and second fluidized bed reactors with granular calcium carbonate in a fluorine fixing reactor at a temperature of 150 to 300° C. to produce calcium fluoride.

7. A method for processing depleted $UF_6$ according to claim 6, further comprising:
    condensing a gas discharged from the fluorine fixing reactor to produce a dilute aqueous hydrogen fluoride solution; and
    recycling the dilute aqueous hydrogen fluoride solution to a steam generator to form steam for use in the first and second fluidized bed reactors.

8. A method for processing depleted $UF_6$ according to claim 6, wherein the calcium fluoride produced in the reacting step of the hydrogen fluoride and granular calcium carbonate is in a form of granules.

9. A method for processing depleted $UF_6$ according to claim 6, wherein the reacting steps of the depleted $UF_6$ and steam, and the $UO_2F_2$ and steam comprise a dry vapor phase reaction.

10. A depleted $UF_6$ processing plant according to claim 1, wherein the granular calcium carbonate in the fluorine fixing reactor comprises calcium carbonate granules having a grain size of 350 to 800 $\mu$m.

* * * * *

UNITED STATES PATENT AND TRADEMARK OFFICE
CERTIFICATE OF CORRECTION

PATENT NO. : 6,451,274 B1
DATED : September 17, 2002
INVENTOR(S) : Koizumi

It is certified that error appears in the above-identified patent and that said Letters Patent is hereby corrected as shown below:

<u>Title page,</u>
Item [45], and the Notice information should read as follows:

-- [45] **Date of Patent: \*Sep. 17, 2002**

(\*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Fourth Day of March, 2003

JAMES E. ROGAN
*Director of the United States Patent and Trademark Office*